MAGNETIC STORAGE AND TRANSFER CIRCUITS
Filed Dec. 31, 1962 5 Sheets-Sheet 1
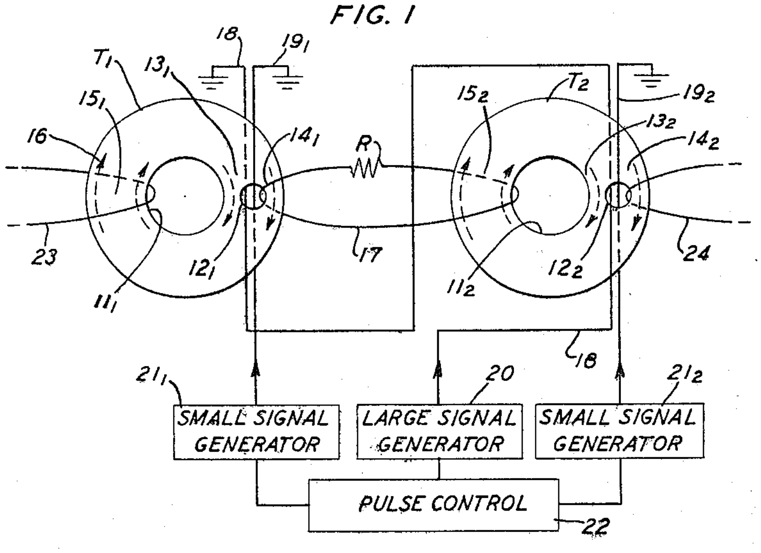
FIG. 2
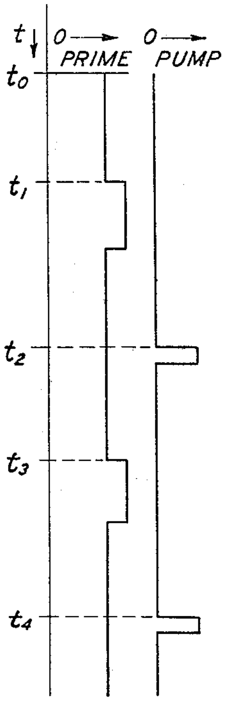
FIG. 3
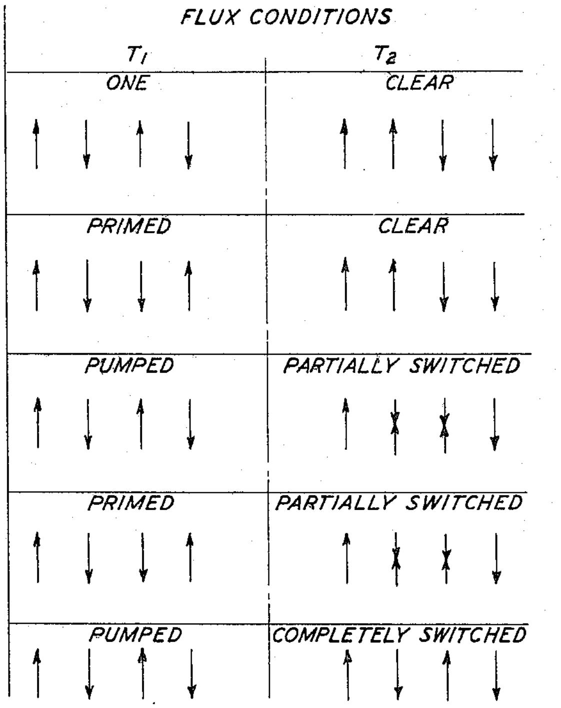
INVENTOR
G. W. DICK
BY *William H. Kaustra*
ATTORNEY Sept. 27, 1966 G. W. DICK 3,275,999

MAGNETIC STORAGE AND TRANSFER CIRCUITS

Filed Dec. 31, 1962 3 Sheets-Sheet 2

S.R.

United States Patent Office 3,275,999

Patented Sept. 27, 1966

3,275,999

MAGNETIC STORAGE AND TRANSFER CIRCUITS

George W. Dick, Morris Township, Morris County, N.J., assignor to Bell Telephone Laboratories, Incorporated, New York, N.Y., a corporation of New York Filed Dec. 31, 1962, Ser. No. 248,457

5 Claims. (Cl. 340—174)

This invention relates to magnetic information storage and transfer circuits. More particularly, this invention relates to the transfer of information from one location in a magnetic circuit to another.

Various magnetic elements such as the toroidal core and the transfluxor have been employed as the basic unit upon which magnetic circuits have been generated, typically, for information handling. The general relating characteristic of these elements is that they are composed of materials having substantially rectangular hysteresis loops and thus exhibit two stable magnetic states and associated switching thresholds.

The toroidal core offers one magnetic flux path acting as a simple electrical-magnetic transducer. Typically, one core is coupled by an electrical conductor to another core for the transfer of information therebetween. A certain degree of complication is necessary in the transfer circuitry to avoid among other things the bidirectional propagation of the information between cores. The transfluxor offers further versatility over the toroidal core in that it provides a plurality of magnetic flux paths within it. Transfluxors like the toroidal cores typically are connected by electrical conductors for the transfer of information therebetween. However, in the case of transfluxors, the transfer circuit may be simpler because the internal flux path structure is capable of carrying some of the burden which in the case of toroidal cores is carried by the transfer circuit. We are concerned here primarily with transfluxor transfer circuitry.

One of the major continuing problems in the information handling art is the expeditious transfer of information from one magnetic element to the next as in transfluxor circuits. More specifically, information, for example, in a diodeless, resistance coupled transfluxor shift register of the type described in Patent No. 3,045,215 of U. F. Gianola, issued July 17, 1962, is transferred from transfluxor to transfluxor through a transfer conductor which includes only its inherent resistance therein. The resistance introduces flux attenuation in the line which in turn requires a multiple turns ratio, typically 2:1, to compensate for the attenuation and to enable the induction of sufficient flux in the second transfluxor for causing suitable flux switching there. Thus, flux attenuation conventionally requires a compensating structure characterized inherently by flux gain when activated.

One disadvantage in a multiple turn coupling is that each turn introduces an additional back magnetomotive force or loading effect in the transfer loop thus causing an increase in the time required for the circuit to handle a particular signal. A second disadvantage is that it is increasingly difficult to thread additional windings through a small aperture such as is provided in a transfluxor.

It is an object of this invention to provide a magnetic circuit which enables flux gain in a transfer circuit including coupling windings having unity turns ratio.

A further object of this invention is a new and improved shift register.

The foregoing and other objects of this invention are realized in one specific embodiment wherein the output leg of a transfer transfluxor is coupled to the input leg of a transferee transfluxor by unity turns ratio windings. Means are provided to set the output leg and the input leg in different stable magnetic states. A small signal means is connected to the output leg for switching the magnetic state of the leg, causing an induced current pulse in the transfer winding of insufficient amplitude to cause more than a transient flux excursion in the input leg of the transferee transfluxor. Also, a large signal means is connected to the output leg, causing flux switching there in a direction opposite to that of the small signal means. In this manner, a second current pulse is induced in the transfer winding of an amplitude sufficient to cause a partial flux switching about the input leg of the transferee transfluxor. The application of successive pairs of small and large pulses causes continual switching of the flux in the output leg and, simultaneously, build-up of flux in the input leg to any desired level for eventual switching thereof.

Thus, in accordance with this invention, it is a feature thereof that means for applying small and large pulses be connected to the output leg of a transferor magnetic element and activated alternately for reiterative switching thereof.

In accordance with this invention, it is a second feature thereof that the transferor and transferee elements be coupled by unity turns ratio transfer windings.

In accordance with one embodiment of this invention, it is a feature thereof that the small and large pulsing means connected to the output leg apply signals there which induce in the coupling winding pulses of differing amplitudes for effecting the accumulation of increments of flux in the input of the transferee element.

The invention and the further objects and features thereof will be understood more fully with reference to the following description rendered in conjunction with the accompanying drawing wherein:

FIG. 1 depicts a transferor and transferee transfluxor coupled by unity turns ratio windings and including circuitry for the transfer of information therebetween;

FIG. 2 depicts the time sequence of drive pulse waveforms in accordance with this invention;

FIG. 3 is a table illustrating the change in flux in the various flux paths of the magnetic element during the operation in accordance with this invention;

Figure 4:
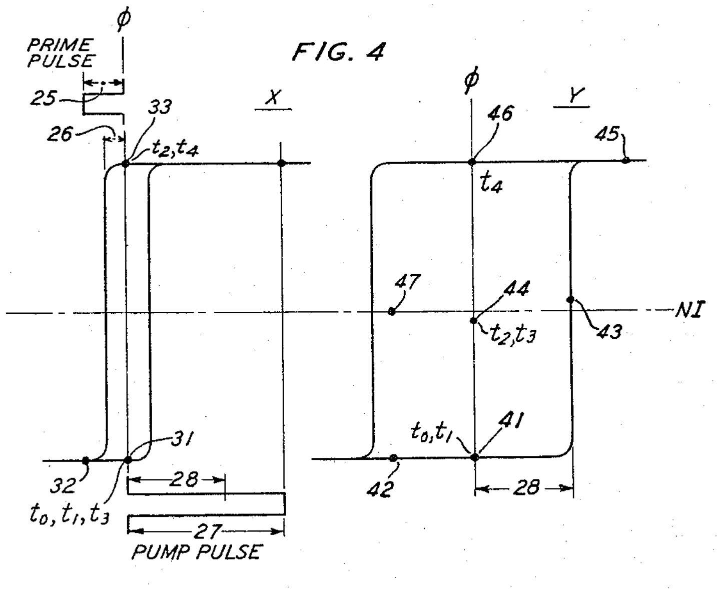
FIG. 4 depicts idealized curves similar to hysteresis loops for a pair of magnetic elements also showing changes in flux density effected therein by various drive pulses in accordance with this invention.

It is to be understood that the figures are not necessarily to scale, certain dimensions being exaggerated for purposes of illustration only.

A specific embodiment in accordance with this invention as depicted in FIG. 1 comprises a pair of transfluxors $T_1$ and $T_2$ between which information is to be transferred. Each transfluxor includes a central aperture 11 and a radial aperture 12 dividing the transfluxor into three flux carrying legs 13, 14 and 15, each of legs 13 and 14 defined by the radial aperture being capable of carrying what for convenience may be termed a single unit of flux and a third leg 15 being capable of carrying two such units of flux. The flux carrying capacity of the several legs is indicated by the dashed arrows 16 which are assumed, for one operative state to be described, to be in clockwise direction, as viewed in the drawing, although either direction of flux could have been chosen. A conductor or transfer loop 17 including a resistor R therein is threaded through radial aperture $12_1$ of transfluxor $T_1$ and central aperture $11_2$ of transfluxor $T_2$ by unity turns ratio windings, advantageously 1:1. The subscripts 1 and 2 are to identify the transfluxor to which the referenced structure belongs. For a given core material and geometry, the magnitude of the resistance R can vary in accordance with this invention from a minimum value representing the inherent resistance of the transfer loop to a maximum value related in a well known manner to the amplitude of the prime pulse described hereinafter. The changes of the direction of flux in leg $14_1$, conveniently termed the output leg, are controllably reflected in leg $15_2$, conveniently termed the input leg. The means for controlilng changes of the direction of flux in leg $14_1$ and the resulting flux changes reflected in leg $15_2$ comprise conductors 18 and $19_1$. A conductor $19_2$ serves the same function with respect to transfluxor $T_2$ as does conductor $19_1$ with respect to transfluxor $T_1$. The conductor 18 is threaded in a like sense through apertures $12_2$ and $12_1$ from a large signal generator 20 to ground. The conductors $19_1$ and $19_2$ also are threaded through apertures $12_1$ and $12_2$ in a like sense from small signal generators $21_1$ and $21_2$ respectively to ground. Pulse generators or sources 20, $21_1$ and $21_2$ are connected to pulse control means 22 for alternating the current pulses therefrom. Information access to and from this pair of transfluxors is by way of conductors 23 and 24 which may be identical in every respect to conductor 17. As is shown hereinafter, these conductors are connected to an input pulse source and a utilization circuit, respectively. In FIG. 1 the sense of each of conductors 18 and $19_1$ is shown to be opposite to one another. Such senses are assumed for drive currents flowing in one direction from the pulse sources to facilitate the description. However, the senses of either or both of the conductors can be changed as long as corresponding changes in the polarity of the current pulses from generators 20 and 21 are made. All that is required here in connection with the transfer of information in accordance with this invention from transfluxor $T_1$ to transfluxor $T_2$ is that alternating pulses from the pulse generators 20 and $21_1$ cause continual switching of flux in the output leg $14_1$. The sense of the windings, the direction of flux, the drive pulses and resulting changes of flux will be understood more fully from the following description of the operation of the arrangement of FIG. 1 rendered in conjunction with FIGS. 2, 3 and 4.

Although the embodiment of FIG. 1 employs transfluxors including only one radial aperture, it is to be understood that transfluxors employing a second radial aperture can be utilized in the practice of this invention. Further, it may be advantageous to thread a second radial aperture with the transfer loop. However, the advantages and disadvantages of such modifications are well known in the art and further discussion thereof here is unnecessary.

Basically, this invention is concerned with the transfer of information in terms of a particular flux pattern from one site to another. The particular flux pattern shown in FIG. 1 represents a "clear" flux state wherein all flux is in a clockwise direction as previously stated. Information is represented by a perturbation of the clear flux state as, for example, shown in FIG. 1. Specifically, one unit of flux in leg $15_1$ may be switched to the counterclockwise direction. The flux in leg $13_1$ would then switch to provide a complete flux closure path. The resulting flux configuration, namely, one flux unit in the clockwise direction and one in the counterclockwise direction, is assumed here to represent a stored "one" and is shown as the initial flux state of transfluxor $T_1$ in FIG. 3. The object of this transfer mechanism, as is the object of most transfer mechanisms, is to transfer this stored "one" into transfluxor $T_2$ nondestructively, that is, while maintaining the information in transfluxor $T_1$. The circuit means according to this invention for accomplishing this transfer including unity turns ratio transfer windings is believed a radical departure from the prior art.

Specifically, in accordance with the foregoing, transfluxor $T_1$ is set into a stored "one" flux configuration conveniently by the proper activation of conductor 23 by a suitable pulse generator. Transfluxor $T_2$ is left in the clear state. The generator for setting a stored "one" in transfluxor $T_1$ is not shown here. However, in practice it would comprise typically an additional magnetic element having flux switching induced therein.

The sequence of driving pulses for the typical operation of the arrangement of FIG. 1 is shown in FIG. 2. Specifically, time $t$ is depicted as the ordinate of FIG. 2 and is read downward, the drive pulses being represented in order. The first #1 prime pulse, the first pump pulse, the second #1 prime pulse and the second pump pulse, as the pulses may conveniently be termed, follow in the sequence shown. The abscissa represents pulse amplitude. However, the amplitudes are not shown in their proper relative scale because, as will be seen, one pulse advantageously is much larger, typically about twenty times that of the other. Although transfluxor $T_1$ is shown in a clear state in FIG. 1, at $t_0$ transfluxor $T_1$ is assumed to have a stored "one" therein while $T_2$ initially is in the clear state as shown in FIG. 3 by the initial flux pattern. At $t_1$ a first drive pulse, termed a prime pulse, is applied to conductor $19_1$ from small signal generator $21_1$ and is in a direction and of an amplitude sufficient only to switch output leg $14_1$ about the minor flux path including leg $13_1$ as shown in FIG. 3. Although for a given resistance R in the transfer loop a corresponding instantaneous electromotive force or E.M.F.

$$e \approx \frac{d\varphi}{dt}$$

where $\varphi$ is flux density and $t$ is time is induced in loop 17, $e$ tends to induce a flux change in leg $15_2$ of transfluxor $T_2$ in a direction in which the leg is already saturated. Consequently, there is only a shuttle flux change in $T_2$. Accordingly, after the prime pulse terminates, transfluxor $T_1$ is "primed" but transfluxor $T_2$ remains clear as shown as the second set of flux conditions in FIG. 3. Next in time at $t_2$ a pulse, termed the pump pulse, from large signal generator 20 is applied to conductor 18. It will be remembered that this pulse effects a flux change in output leg $14_1$ always in a direction opposite to that effected by the prime pulse and is of a much greater amplitude, characteristically, more than sufficient to switch flux around a major flux path including leg $14_1$ and leg $15_1$. However, a minor flux closure path is available through leg $13_1$ for all the flux switched thereby in leg $14_1$. It is well known that flux changes will seek the least reluctance and hence the shortest path for closure. Therefore, as shown in the third flux pattern for transfluxor $T_1$, FIG. 3, there results from the first pump pulse a flux switching around the minor path of transfluxor $T_1$ which encompasses legs $13_1$ and $14_1$. It is noted here that the prime pulse is of longer duration than the pump pulse because the prime pulse is of limited amplitude and requires longer to switch a core. For the amplitude ratio of pump to prime pulse of twenty to one, the duration of the prime pulse is approximately twenty times that of the pump pulse. Such considerations are well known in connection with resistance coupled shift registers. In response to the pump pulse an E.M.F. is induced in loop 17. However, the pump pulse is larger than the prime pulse. Thus for the same resistance R the E.M.F. induced in loop 17 by the pump pulse is in excess of that induced by the prime pulse or, in other words, $d\varphi/dt$ in this case is larger. Consequently, there results in transfluxor $T_2$ a partial switching about the major flux path encompassing legs $15_2$ and $13_2$, again the shortest available flux path. This partial flux switching is shown in FIG. 3 by opposing arrows in the flux pattern corresponding to legs $15_2$ and $13_2$. Next at time $t_3$ a second prime pulse is provided. Again the flux in legs $13_1$ and $14_1$ switches, inducing an E.M.F. in loop 17. However, attenuation by way of resistance R in loop 17 renders the induced E.M.F. ineffectual for producing flux switching in transfluxor $T_2$. Finally, at $t_4$, a second pump pulse is applied switching the flux in legs $13_1$ and $14_1$. Again an E.M.F. is induced in loop 17. However, the pump pulse again induces a larger E.M.F. in loop 17 than does the prime pulse and a partial flux switching about legs $13_2$ and $15_2$ results. This partial flux switching is additive to that caused by the previous pump pulse, resulting in the switching of a complete unit of flux about the major flux path of transfluxor $T_2$ encompassing legs $13_2$ and $15_2$. Thus, as shown in FIG. 3, the final flux pattern in transfluxor $T_2$ represents a stored "one" as does the final flux pattern in transfluxor $T_1$.

A complete understanding of the effect of the driving pulses on the transfluxors $T_1$ and $T_2$ is important because this mechanism constitutes a practical solution to flux gain in the absence of multiple turns ratio transfer windings and lies at the base of this invention. Accordingly, the mechanism of the information transfer is now explained in terms of FIG. 4. FIG. 4 depicts a pair of curves X and Y plotting flux density $\varphi$ versus ampere turns NI representing the minor flux path including legs $13_1$ and $14_1$ of transfluxor $T_1$ and the major flux path including legs $15_2$ and $13_2$ of transfluxor $T_2$, respectively, and changes in flux density thereabout in response to the several drive pulses. As is well known:

$$\varphi=BA \qquad (1)$$

where A is the cross-sectional area of the flux path and $$H=4\pi\frac{NI}{l} \qquad (2)$$

where $l$ is the length of the flux path. Since both A and $4\pi N/l$ are constants, the $\varphi$ versus NI curves correspond to the B versus H curve which constitutes the conventional hysteresis curve.

Assuming again, a stored "one" in transfluxor $T_1$, the flux pattern is as shown as the initial flux state for transfluxor $T_1$ in FIG. 3. Application of successive prime and pump pulses switches successively the flux around the radial aperture in the minor flux path encompassing legs $13_1$ and $14_1$. More specifically, assuming the flux in legs $13_1$ and $14_1$ to be initially as shown at point 31 in curve X of FIG. 4, the flux therein is changed by the prime #1 pulse to point 32 and back. The pump #1 pulse switches the flux to point 33; the following prime pulse returns the flux to point 31 and the process repeats. In response to the successive switching, alternating E.M.F.'s are induced in loop 17 of FIG. 1. These E.M.F.'s are of different amplitudes and duration because of the different amplitudes and duration of the prime and pump pulses. In addition, the induced E.M.F's are attenuated by the resistance R. Consequently, the prime pulse which has an amplitude in transfluxor $T_1$ sufficient only to switch flux about a minor flux path or, in other words, an amplitude designated 25 to exceed the minor flux path threshold designated 26 is insufficient to cause more than a transient flux excursion in transfluxor $T_2$. On the other hand, the pump pulse has an amplitude designated 27 sufficient to cause flux switching about a major flux path in both transfluxors $T_1$ and $T_2$, or, in other words, an amplitude to exceed greatly the major flux path threshold designated 28 and shown in both curves X and Y, although in $T_1$ it prefers the minor flux path which is available to it. Nevertheless, the pump pulse causes a larger $d\varphi/dt$ than does the prime pulse and the corresponding induced E.M.F. causes partial flux switching about the major loop of transfluxor $T_2$. In response to the first prime pulse, flux changes in transfluxor $T_2$ from point 41 to 42 on curve Y and back. In response to the first pump pulse, flux switches partially as represented in FIG. 4 by a change on curve Y of FIG. 4 from point 41 to point 43 and finally to point 44 after the first pump pulse, and to point 45 and finally to point 46 during the second pump pulse, thus causing switching not necessarily following the path of the curves. Although each pump pulse is of an amplitude sufficient to cause complete flux switching, the maximum flux capable of being switched is limited by the geometry and material of the first transfluxor. Consequently, only partial switching is obtained on each pump pulse. The intermediate prime pulse has an insufficient amplitude to cause any permanent flux change in transfluxor $T_2$, thus the prime pulse does not return to its original state the flux partially switched. Rather, the prime pulse causes in transfluxor $T_2$ only, for example, a flux excursion from point 44 to point 47 and back. The corresponding points on the two curves X and Y in FIG. 4 are labeled for time correspondence.

Figure 5:
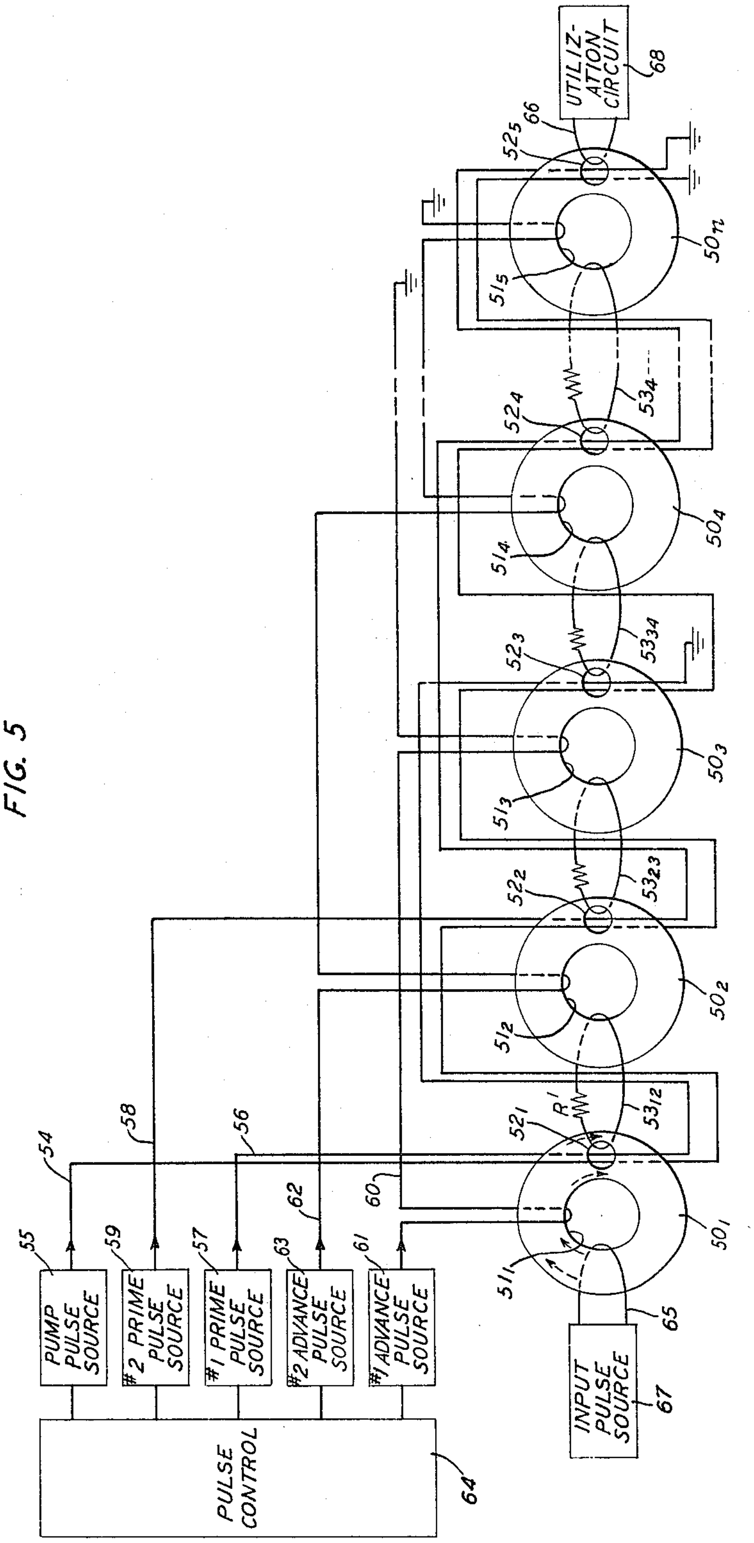
FIG. 5 depicts a two-bit shift register based on the circuit arrangement of FIG. 1.

It is to be understood that the arrangement of FIG. 1 can be utilized advantageously for forming more complex circuits. One such circuit, shown in FIG. 5 is a novel departure from the shift register disclosed in the above noted patent of U. F. Gianola. In that patent only one prime circuit is shown. However, it is well known in the art to utilize two prime circuits. The shift register shown in FIG. 5 utilizes two prime circuits and the unique information transfer means described in the foregoing wherein the windings ratio of the transfer circuit, the pump circuit and the time and amplitudes of the prime and pump pulses achieve flux gain in the absence of multiple turns ratio transfer windings. These features will be apparent from the following discussion of FIG. 5. The figure depicts a shift register in accordance with this invention and embodying the circuit arrangement of FIG. 1. To facilitate the description there will be discussed only so much of the prior art circuitry as is deemed necessary for complete understanding of this invention.

The shift register SR of FIG. 5 comprises a plurality of transfluxors $50_1$ through $50_4$ which constitute two information addresses and a transfluxor $50_n$ which represents the terminal transflux or of the paired series of transfluxors comprising the register. As in FIG. 1, each of the transfluxors 50 includes a large central and a smaller radial aperture 51 and 52. A loop conductor 53 including a resistance R' therein is threaded through the radial aperture of each transfluxor and through the central aperture of the next succeeding transflux or, coupling to each by a single turn thus forming a closed transfer loop therebetween. The subscripts correspond to the transfluxors coupled by each conductor 53. A conductor 54 threads the radial apertures of all the cores serially and in the same sense and is connected to ground at one end and to a pump pulse source 55 at the other. A conductor 56 threads the radial apertures of the odd numbered transfluxor serially and in a sense opposite to that of conductor 54. Conductor 56 is connected to ground at one end and to a #1 prime pulse source 57. Similarly, a conductor 58 threads the radial apertures of the even numbered transfluxors and is connected at one end to ground and at the other end to a #2 prime pulse generator 59. A conductor 60 threads the large central aperture of the odd numbered transfluxors serially and in the same sense, being connected to ground at one end and to a #1 advance pulse generator or source 61. Similarly, a conductor 62 is threaded through the central aperture of the even numbered transfluxors including $T_n$, also being connected at one end to ground and at the other end to a #2 advance pulse source 63. The timing of the various pulses is controlled by a pulse control means 64 as will be described more fully hereinafter. Information access to and from the shift register is provided through conductors 65 and 66 by an input current pulse source 67 and utilization circuit 68, respectively, which are entirely conventional and do not require further description here.

Figure 6:
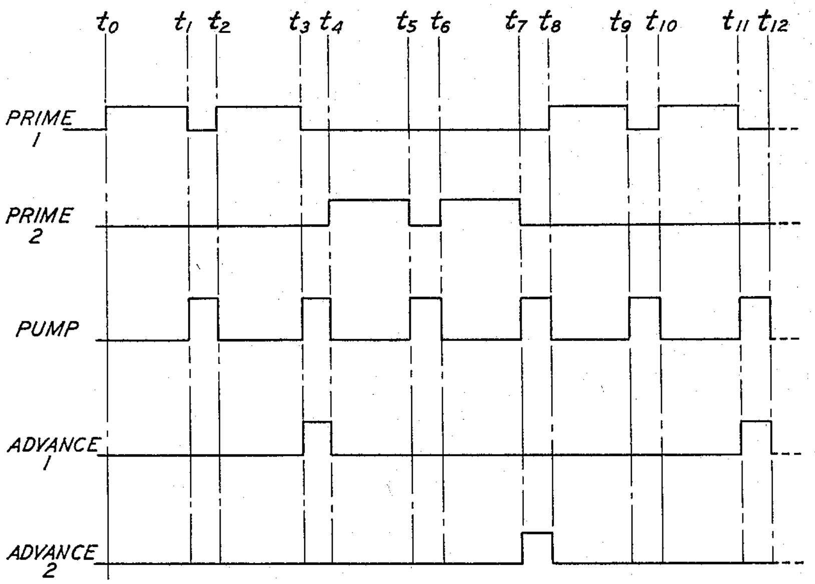
FIG. 6 depicts the drive pulse waveforms for the shift register of FIG. 5.

The sequence of drive pulses for the operation of the shift register of FIG. 5 is shown in FIG. 6 where $t_0$ is taken as the time of the leading edge of the first prime pulse. Transfluxor $50_1$ is assumed to have been set in the stored "one" flux state by input pulse source 67. The remaining transfluxors are assumed to be in the clear state. The operation of the shift register is as discussed in connection with FIGS. 2 and 3, requiring, in sequence, the initiation of a #1 prime pulse at $t_0$, a pump pulse at $t_1$, a second #1 prime pulse at $t_2$ and a second pump pulse at $t_3$. It is not necessary to discontinue the prime pulse during the pump pulse because the amplitude of the latter is so much larger than that of the prime pulse that the latter is swamped out. Simultaneously, with the second pump pulse there is applied a #1 advance pulse the operation of which is well known. At time $t_4$ the information is transferred completely to the even numbered transfluxors, the #1 advance pulse erasing information in all the odd numbered transfluxors. The process repeats with first and second #2 prime pulses alternating with first and second pump pulses. At time $t_8$, the information is completely transferred to the odd numbered transfluxors, the #2 advance pulse occurring again simultaneously with the second pump pulse to erase information in all the even transfluxors. The process repeats $n$ times until the utilization circuit 60 is activated.

A direct extension of the invention is the transfer of information from one element to a plurality of elements conventionally termed "fan out." To drive one element requires only two transfer cycles including two pairs of prime and pump pulses. If fan out is desired where a single element drives, for example, two elements, then four transfer cycles including four pairs of prime and pump pulses are required. This is in keeping with prior art considerations which require for driving two elements the transfer of double the amount of flux required to drive one element.

No effort has been made to exhaust the possible embodiments of this invention. It will be understood that the embodiments described are merely illustrative of one form of the invention and various modifications may be made therein by one skilled in the art without departing from the scope and spirit of this invention.

What is claimed is:

1. An information transfer circuit comprising a first and second transfluxor each being apertured to form therein input and output legs, said input and output legs each completing a major flux path in its transfluxor and said output leg also completing a minor flux path in its transfluxor shorter than said major flux path, and means for incrementally driving the input leg of said second transfluxor to a remanent magnetic state comprising a coupling loop for coupling the output leg of said first transfluxor and the input leg of said second transfluxor by unity turns ratio windings, winding means coupled to the output leg of said first transfluxor, and means for alternately applying to said winding means first and second pulses repeatedly to switch said last mentioned output leg, said first pulses being of a magnitude to switch at a first rate of flux change said output leg around only said minor flux path and said second pulses being of a magnitude to switch said output leg at a second greater rate of flux change.

2. An information transfer circuit in accordance with claim 1 wherein said coupling loop includes an additional resistance therein.

3. An information transfer circuit in accordance with claim 2 wherein said unity turns ratio is 1:1.

4. An information transfer circuit comprising pairs of first and second transfluxors, each of said first and second transfluxors being apertured to form therein input and output legs, said input and output legs each completing a major flux path in its transfluxor and said output leg also completing a minor flux path therein shorter than said major flux path, information transfer means coupling by unity turns ratio windings the output leg of each of said first and second transfluxors with the input leg of the next succeeding transfluxor for forming an ordered sequence thereof, first winding means coupled to the output leg of each of said first and second transfluxors respectively, second and third winding means coupled to the output legs of said first transfluxors and said second transfluxors respectively, means for applying alternatingly first to said first and second winding means and second to said first and third winding means first and second sets of alternately positive and negative pulses to switch repeatedly first the output legs of said first transfluxors and second to switch repeatedly the output legs of said second transfluxors, said first set of pulses each being of a magnitude to switch at a first rate of flux change the corresponding output legs around only said minor flux path, and said second set of pulses each being of a magnitude to switch the corresponding output legs at a second greater rate of flux change for ultimately switching the input legs of the next succeeding transfluxor, fourth winding means coupling the central aperture of said first transfluxors, fifth winding means coupling the central aperture of said second transfluxors, and means for applying to said fourth and fifth winding means third and fourth pulses each coincident with the final second pulse which switches the output leg of the corresponding transfluxors, and a utilization circuit connected to the terminal transfluxor of said ordered sequence.

5. An information transfer circuit in accordance with claim 4 wherein said unity turns ratio is 1:1.

No references cited.

BERNARD KONICK, *Primary Examiner.*

G. LIEBERSTEIN, *Assistant Examiner.*